United States Patent [19]

Ito

[11] Patent Number: 5,457,660
[45] Date of Patent: Oct. 10, 1995

[54] RESET SIGNAL GENERATION CIRCUIT HAVING A FUNCTION FOR PROTECTING WRITE DATA

[75] Inventor: Hidekazu Ito, Kawasaki, Japan

[73] Assignee: Motorola, Inc., Schaumburg, Ill.

[21] Appl. No.: 131,818

[22] Filed: Oct. 5, 1993

[30] Foreign Application Priority Data

Oct. 30, 1992 [JP] Japan ................................. 4-316292

[51] Int. Cl.⁶ ............................. G11C 7/00; G06F 7/38; G06F 15/20
[52] U.S. Cl. .................... 365/228; 365/222; 365/189.01; 364/701
[58] Field of Search ............................ 307/272.3, 296.4, 307/594; 364/701; 365/228, 189, 222, 230

[56] References Cited

U.S. PATENT DOCUMENTS

| | | | |
|---|---|---|---|
| 3,737,879 | 6/1973 | Greene et al. ........................ | 365/222 |
| 4,791,614 | 6/1987 | Arakawa .............................. | 365/228 |
| 4,796,235 | 1/1989 | Sparks et al. ........................ | 365/228 |

*Primary Examiner*—Roy N. Envall, Jr.
*Assistant Examiner*—Emmanuel L. Moise
*Attorney, Agent, or Firm*—Rennie William Dover; Harry A. Wolin

[57] ABSTRACT

In a reset signal generation circuit for generating a reset signal to a CPU in accordance with an external clock signal, illegal operation or loss of write data during a write period is prevented.

A means (14) is provided for prohibiting the generation, in accordance with an external reset signal ($\overline{RST}$), of a reset signal (RESET) to the CPU during a data write period of the CPU, and, according to a preferred embodiment of the invention, a means is provided for holding the external reset signal until a reset signal is generated to the CPU.

5 Claims, 2 Drawing Sheets

RESET SIGNAL GENERATION CIRCUIT HAVING A FUNCTION FOR PROTECTING WRITE DATA

FIELD OF THE INVENTION

The present invention relates to reset signal generation circuits that supply a reset signal to a CPU used as a core of various types of digital control units, and, more specifically, to a reset signal generation circuit including a write-data protection capability.

DESCRIPTION OF THE PRIOR ART

A CPU used as the heart of various digital control units employs a reset signal to reset its condition to the initial state upon power-up or upon fault occurrence during operation. In the CPU receiving the reset signal, various internal registers and program counters are set to all-zero or other initial values, while disabling the CPU. Such reset signals include internal reset signals that are automatically generated in the CPU upon power-up or fault occurrence, and external reset signals used by the external hardware or user to instruct outside the CPU a transition to the initial state.

Conventionally, a reset signal generation circuit for generating a reset signal to the CPU in accordance with such external reset signals comprises, as shown in FIG. 4, an input terminal (reset pin) 41 for receiving an external reset signal $\overline{RST}$; a D flip-flop 42 for holding the external reset signal $\overline{RST}$ in sync with a system clock CLK; and a reset logic circuit 43 for generating to the CPU (not shown) a reset signal $\overline{RESET}$ of a predetermined waveform from the reset signal $\overline{DRST}$ held in the D flip-flop.

In the prior reset signal generation circuit shown in FIG. 4, the external reset signal is immediately input to the reset logic circuit in sync with the system clock signal to generate the reset signal RESET to the CPU. Thus, when the external reset signal is input while the data is being written by the CPU, the write operation of the CPU is disabled, and thus the latter one byte of the double write data may not be written, for instance, so that illegal data write may occur or a portion of the data that have been saved from the CPU to the RAM may be lost. As a result, applications that require data backup pose a problem of errors in subsequent processing associated with illegal or lost data.

OBJECT OF THE INVENTION

To solve the afore-mentioned prior art problem, the reset signal generation circuit having write data protection capability according to the present invention comprises a means for inhibiting the generation of a reset signal to the CPU in accordance with the external reset signal during a period of data write of the CPU, and, more preferably, also comprises a means for holding the external reset signal until the generation of the reset signal to the CPU.

SUMMARY OF THE INVENTION

Generally, a write signal (W) is output from the CPU, informing the peripheral units such as the RAM control unit and I/O ports that the data is being written or read. As the external reset signal is masked by the write signal, the generation of the reset signal to the CPU is inhibited during the period of data writing by the CPU. As a result, generation of illegal data or loss of data associated with disabled write operation is effectively avoided.

DETAILED DESCRIPTION OF THE PREFERRED EMBODIMENT

Figure 1:
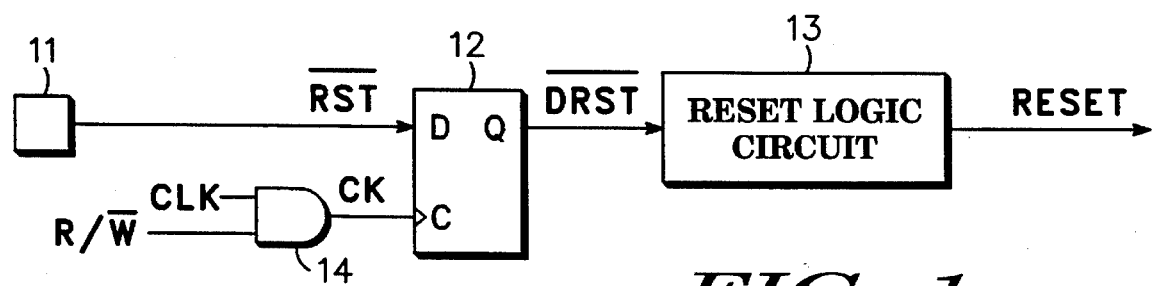
FIG. 1 is a circuit diagram showing a reset signal generation circuit having a write-data protection capability according to one embodiment of the present invention.

Referring to FIG. 1, there is shown a circuit diagram illustrating a reset signal generation circuit having a write-data protection capability according to one embodiment of the present invention, where reference numerals 11, 12, 13 and 14 denote an input terminal (reset pin) for the external reset signal, a D flip-flop, a reset logic circuit, and a two-input AND gate, respectively.

To the D input terminal of the D flip-flop 12 is supplied an external reset signal $\overline{RST}$ via the input terminal 11. A system clock signal CLK is supplied to one of the input terminals of the two-input AND gate 14, and a read/write signal (R/$\overline{W}$) is supplied from the CPU (not shown) to the other input terminal. The clock signal CK output from the two-input AND gate 14 is supplied to the clock input terminal C of the D flip-flop 12, and the delayed external reset signal $\overline{DRST}$ output from the D flip-flop 12 is supplied to the reset logic circuit 13. The reset logic circuit 13 is a circuit for receiving the delayed external reset signal DRST and generating a reset signal RESET having a predetermined level and width, which reset signal is supplied to the CPU. The reset logic circuit 13 may be dedicated to the external reset signal line or common to the internal reset signal lines.

Figure 3:
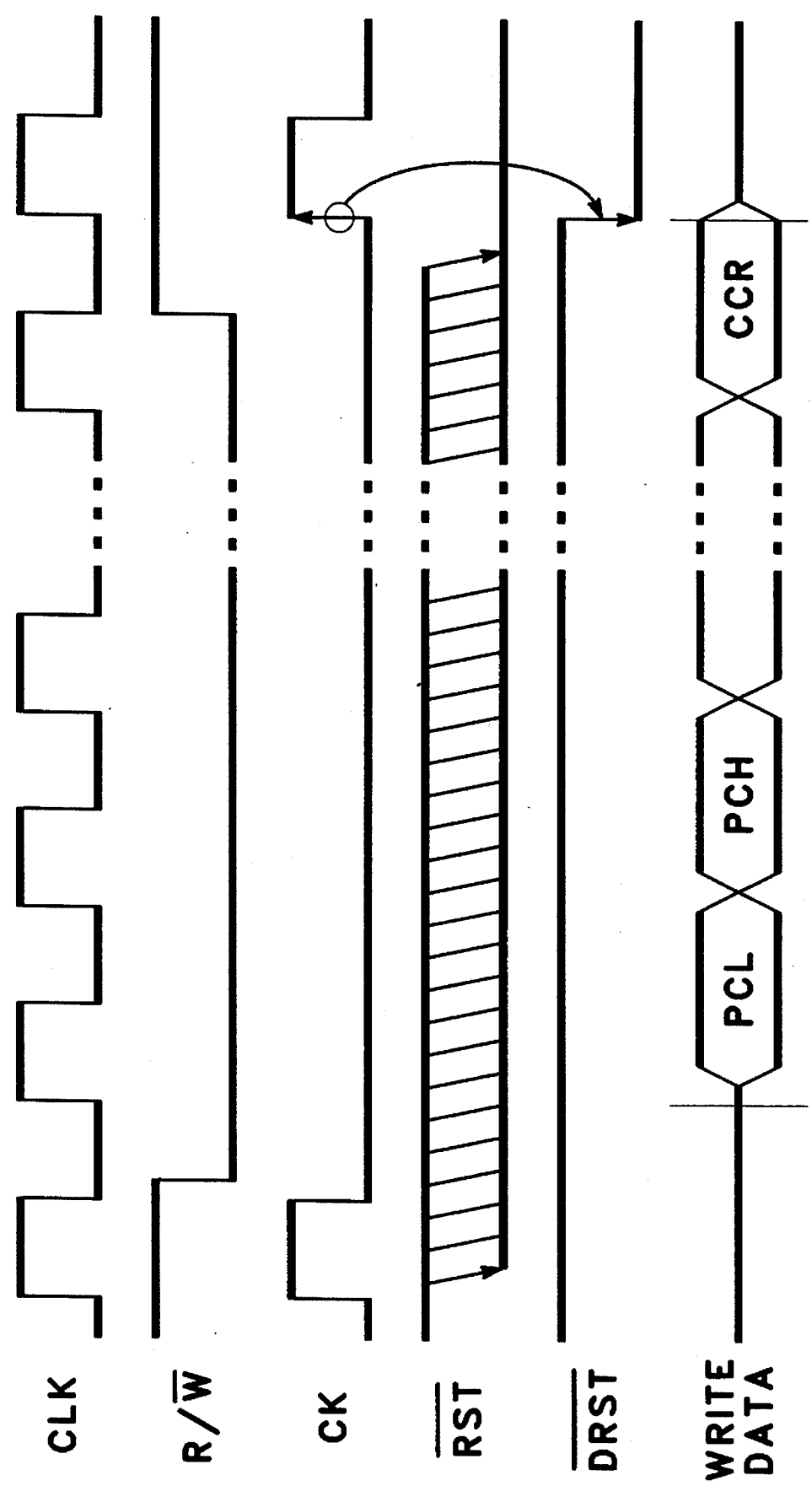
FIG. 3 is a waveform diagram for explaining the operation of the circuit shown in FIG. 1 and FIG. 2.

As shown in the waveform diagram of FIG. 3, when the read/write signal R/$\overline{W}$ falls to a low state at the beginning of the data write operation by the CPU, the output of the clock signal CK from the two-input AND gate 14 is inhibited, so that even when the external reset signal $\overline{RST}$ falls to the low state during that time, the low signal is not held in the D flip-flop 12. Thus, the delayed external reset signal $\overline{DRST}$ output from the D flip-flop 12 remains high, and a high reset signal RESET is not output from the reset logic circuit 13 to the CPU. During that period of time, a data write by the CPU occurs, as illustrated by the write data at the bottom in FIG. 3. It is appreciated that a saving operation is illustrated as a data write operation by the CPU where multiple data are successively written into RAM.

At the end of the data write by the CPU, when the read/write signal R/$\overline{W}$ returns to the high state, the output of the clock signal CK from the two-input AND gate 14 resumes, and in sync with the rising edge of the starting clock signal CK, the external reset signal RST that has fallen to the low state is held in the D flip-flop 12. Thus, the delayed external reset signal $\overline{DRST}$ output from the D flip-flop 12 falls to the low state, and from the reset logic circuit 13 in response thereto, the reset signal RESET that rises to the high state during a predetermined period is supplied to the CPU, so that the CPU is reset in response.

Figure 2:
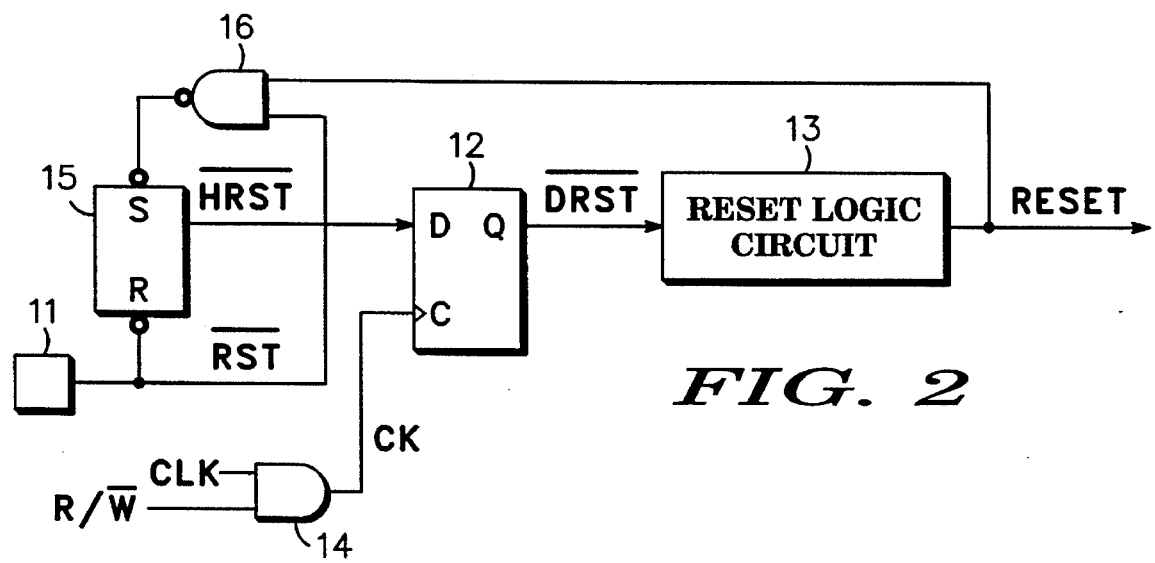
FIG. 2 is a circuit diagram showing a reset signal generation circuit having a write-data protection capability according to another embodiment of the present invention.
Figure 4:
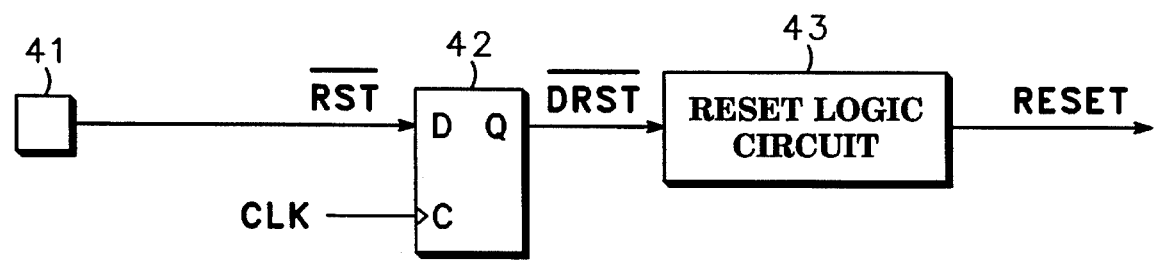
FIG. 4 is a circuit diagram showing a prior art reset signal generation circuit.

Referring to FIG. 2, there is shown a circuit diagram illustrating a reset signal generation circuit with write data protection capability according to another embodiment of the present invention. In the figure, items with similar reference numerals are identical to corresponding items described with reference to FIG. 1, so the description of those items is omitted hereinbelow. The reset signal generation circuit according to the present embodiment comprises an RS flip-flop 15 for holding a reset signal $\overline{\text{RST}}$ supplied to an input terminal 11 until a reset signal RESET to the CPU is generated; and a two-input NAND gate 16 for canceling the hold state of the external reset signal $\overline{\text{RST}}$.

As the external reset signal $\overline{\text{RST}}$ falls to the low state, the RS flip-flop is reset, and its output $\overline{\text{HRST}}$ is caused to fall to the low state. Once the RS flip-flop 15 is reset, the RS flip-flop 15 is kept in the reset condition even when the external reset signal $\overline{\text{RST}}$ returns to the high state, unless the reset signal RESET supplied to one of the input terminals of the two-input NAND gate 16 rises to the high state. Thus, as shown in FIG. 3, when the CPU is saving the data to RAM for a relatively long period, during which it is not guaranteed that the external reset signal $\overline{\text{RST}}$ is kept low, the low signal $\overline{\text{HRST}}$ is continuously supplied to the D input terminal of the D flip-flop 12 until the clock signal CK is output from the AND gate 14 at the end of the data saving operation.

As a result, the D flip-flop 12 is reliably inverted to the low state at the end of a series of data writes by the CPU to assure that the high reset signal RESET to the CPU is generated. When the external signal $\overline{\text{RST}}$ returns to the high state while the reset signal RESET to the CPU rises to the high state, the output of the NAND gate 16 falls to the low state, resetting the RS flip-flop 15, so that the RS flip-flop 15 returns to the initial (high) state.

Accordingly, by adding a means as RS flip-flop 15 for holding the external reset signal, a reset signal to the CPU can be reliably generated regardless of any hold time requirements for holding the external reset signal in the low state. Also, by adding such a means for holding the external reset signal, malfunctions due to chattering of the input mechanism for the external reset signal are avoided.

While an implementation for gating a system clock signal in response to a read/write signal R/W has been described, it should be appreciated that if read (R) and write (W) signals are separate from each other, a system clock signal may be gated by an individual write signal (W).

As described in detail above, since the reset signal generation circuit according to the present invention includes a means for inhibiting the generation of a reset signal to the CPU in accordance with an external reset signal during a period of data write of the CPU, the write data being written will not become illegal or lost due to disabled data writing of the CPU, thus advantageously assuring reliable protection of the write data.

Also, in accordance with the embodiment of the present invention where a means is added for holding the external reset signal until a reset signal to the CPU is generated, the constraints on the hold time for the external reset signal are advantageously eliminated, while effectively avoiding malfunctions due to chattering of the input mechanism for the external reset signal.

We claim:

1. A reset signal generation circuit having a function for protecting write data by generating a reset signal to a CPU in accordance with an external clock, the reset signal generation circuit comprising:

a circuit being responsive to the external clock and a read/write signal from the CPU for prohibiting an external reset signal from generating the reset signal to the CPU during a data write period of the CPU.

2. A reset signal generation circuit having a function for protecting write data according to claim 1, comprising a means for holding the external reset signal until the reset signal to the CPU is generated.

3. A reset signal generation circuit for protecting write data by generating a reset signal to a CPU in accordance with an external clock, said reset signal generation circuit comprising:

a flip-flop circuit having a data and a clock input and an output, said data input of said flip-flop circuit coupled to receive an external reset signal, said output of said flip-flop circuit coupled for providing the reset signal to the CPU; and a gate circuit having first and second inputs and an output, said first input of said gate circuit coupled to receive the external dock, said second input of said gate circuit coupled to receive a read/write signal, said output of said gate circuit coupled to said clock input of said flip-flop circuit.

4. The reset signal generation circuit according to claim 3 further including a hold circuit for holding said external reset signal until the reset signal is generated.

5. A reset signal generation circuit for protecting write data by generating a reset signal to a CPU in accordance with an external clock, said reset signal generation circuit comprising:

a D-flip-flop circuit having a data and a clock input and an output, said output of said D-flip-flop circuit coupled for providing the reset signal to the CPU;

a first gate circuit having first and second inputs and an output, said first input of said first gate circuit coupled to receive the external clock, said second input of said gate circuit coupled to receive a read/write signal, said output of said gate circuit coupled to said clock input of said D-flip-flop circuit;

a second gate circuit having first and second inputs and an output, said first input of said second gate circuit coupled to receive the reset signal, said second input of said gate circuit coupled to receive an external reset signal; and an RS flip flop having set and reset inputs and an output, said set input of said RS flip-flop coupled to said output of said second gate circuit, said reset input of said RS flip-flop coupled to receive said external reset signal, said output of said RS flip-flop coupled to said data input of said D-flip-flop.

\* \* \* \* \*

UNITED STATES PATENT AND TRADEMARK OFFICE
CERTIFICATE OF CORRECTION

PATENT NO. : 5,457,660
DATED : October 10, 1995
INVENTOR(S) : Hidekazu Ito

It is certified that error appears in the above-indentified patent and that said Letters Patent is hereby corrected as shown below:

In column 4, line 25, claim 3, delete "dock" and insert therefor --clock--.

Signed and Sealed this

Nineteenth Day of December, 1995

Attest:

BRUCE LEHMAN

Attesting Officer

Commissioner of Patents and Trademarks